US006317821B1

(12) United States Patent
Batten et al.

(10) Patent No.: US 6,317,821 B1
(45) Date of Patent: *Nov. 13, 2001

(54) VIRTUAL SINGLE-CYCLE EXECUTION IN PIPELINED PROCESSORS

(75) Inventors: Dean Batten, Allentown; Paul Gerard D'Arcy, Harleysville; C. John Glossner, Allentown; Sanjay Jinturkar; Jesse Thilo, both of Bethlehem, all of PA (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/080,787

(22) Filed: May 18, 1998

(51) Int. Cl.[7] .......................................................... G06F 9/30
(52) U.S. Cl. .............................................................. 712/200
(58) Field of Search .............................. 712/23, 216, 200, 712/205, 208

(56) References Cited

PUBLICATIONS

Val Popescu, "The Metaflow Architecture", IEEE Micro, pp. 10–13 and 63–73, Jun. 1991.*
James E. Smith, "Dynamic Instruction Scheduling And The Astronautics ZS–1", IEEE, pp. 21–34, Jul. 1989.*
D.A. Patterson and J.L. Hennessy, "Computer Architecture: A Quantitative Approach," Second Edition, Morgan Kaufmann, San Francisco, CA, pp. 240–261, 1996.

* cited by examiner

Primary Examiner—David Y. Eng

(57) ABSTRACT

A pipelined processor is configured to provide virtual single-cycle instruction execution using a register locking mechanism in conjunction with instruction stalling based on lock status. In an illustrative embodiment, a set of register locks is maintained in the form of a stored bit vector in which each bit indicates the current lock status of a corresponding register. A decode unit receives an instruction fetched from memory, and decodes the instruction to determine its source and destination registers. The instruction is stalled for at least one processor cycle if either its source register or destination register is already locked by another instruction. The stall continues until the source and destination registers of the instruction are both unlocked, i.e., no longer in use by other instructions. Before the instruction is dispatched for execution, the destination register of the instruction is again locked, and remains locked until after the instruction completes execution and writes its result to the destination register. The decode unit can thus dispatch instructions to execution units of the processor as if the execution of each of the instructions completed in a single processor cycle, in effect ignoring the individual latencies of the execution units. Moreover, the instructions can be dispatched for execution in a program-specified order, but permitted to complete execution in a different order.

23 Claims, 4 Drawing Sheets

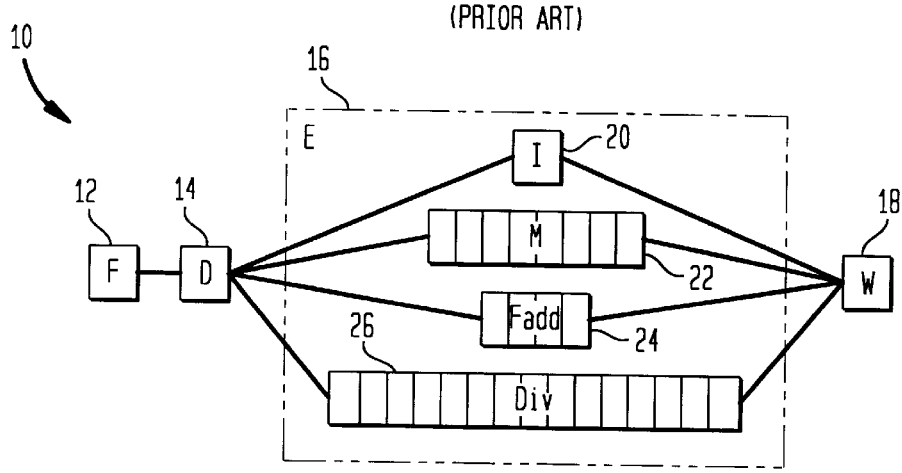

FIG. 2C
(PRIOR ART)

|   |   | 1 | 2 | 3 | 4 | 5 | 6 | 7 | 8 | 9 | 10 | 11 |
|---|---|---|---|---|---|---|---|---|---|---|----|----|
| $i_1$ | mult r1,r2,r3 | F | D | M1 | M2 | M3 | M4 | M5 | M6 | M7 | M8 | W |
| $i_2$ | brz label r4 |   | F | D | E | W |   |   |   |   |    |    |
| $i_3$ | add r5,r6,r7 |   |   | F | D | E | W |   |   |   |    |    |
|   | label: |   |   |   |   |   |   |   |   |   |    |    |
| $i_4$ | add r5,r8,r9 |   |   |   |   | F | D | E | W |   |    |    |

| $r_0$ | $r_1$ | $r_2$ | $r_3$ | $r_4$ | ... | $r_{31}$ |
|---|---|---|---|---|---|---|

FIG. 4A

|  |  | 1 | 2 | 3 | 4 | 5 | 6 | 7 |
|---|---|---|---|---|---|---|---|---|
| $i_1$ | add r1,r2,r3 | F | D | I1 | W |  |  |  |
|  | r1 locked |  | ✓ | ✓ | ✓ |  |  |  |
| $i_2$ | add r4,r5,r1 |  | F | st. | st. | D | I1 | W |

FIG. 4B

|  |  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| $i_1$ | mult r1,r2,r3 | F | D | M1 | M2 | M3 | M4 | M5 | M6 | M7 | M8 | W |  |  |  |
|  | r1 locked |  | ✓ | ✓ | ✓ | ✓ | ✓ | ✓ | ✓ | ✓ | ✓ | ✓ |  |  |  |
| $i_2$ | add r1,r4,r5 |  | F | st. | st. | st. | st. | st. | st. | st. | st. | st. | D | I | W |

FIG. 4C

|  |  | 1 | 2 | 3 | 4 | 5 | 6 | 7 | 8 | 9 | 10 | 11 |
|---|---|---|---|---|---|---|---|---|---|---|---|---|
| $i_1$ | mult r1,r2,r3 | F | D | M1 | M2 | M3 | M4 | M5 | M6 | M7 | M8 | W |
| $i_2$ | brz label r4 |  | F | D | E | W |  |  |  |  |  |  |
| $i_3$ | add r5,r6,r7 |  |  | F | st. | - | - |  |  |  |  |  |
|  | label: |  |  |  |  |  |  |  |  |  |  |  |
| $i_4$ | add r5,r8,r9 |  |  |  |  |  | F | D | E |  |  |  |

VIRTUAL SINGLE-CYCLE EXECUTION IN PIPELINED PROCESSORS

FIELD OF THE INVENTION

The present invention relates generally to microprocessors and other types of digital data processors, and more particularly to digital data processors which utilize pipelined processing techniques.

BACKGROUND OF THE INVENTION

Modern processors are often pipelined, meaning that execution of each instruction is divided into several stages. FIG. 1 shows a functional block diagram of a conventional pipelined processor 10. This exemplary pipelined processor includes four stages: a fetch (F) stage 12, a decode (D) stage 14, an execute (E) stage 16, and a writeback (W) stage 18. Pipelined processors such as processor 10 may be register-based, i.e., other than for load or store instructions, the source(s) and destination(s) of each instruction are registers. The fetch unit 12 retrieves a given instruction from an instruction memory. The decode stage 14 reads the source register(s) of the instruction, and the writeback stage 18 writes to the destination register(s) of the instruction. In the execute stage 16, the instruction is executed by one of four specialized execution units: a 1-cycle integer (I) unit 20, an 8-cycle integer/floating point multiplier (M) 22, a 4-cycle floating point adder (Fadd) 24, or a 15-cycle integer/floating point divider (Div) 26. The execution units in this example are fully pipelined, i.e., can accept a new instruction on every clock cycle. These specialized units are used to execute particular types of instructions, and each of the units may have a different latency. An instruction is said to be "dispatched" when it has completed register read in the decode stage 14 and begun execution in the execution stage 16. In other words, a dispatch takes place when an instruction passes from the decode stage 14 to one of the execution units in execution stage 16.

A significant problem with conventional pipelined processors such as processor 10 of FIG. 1 is that the use of a pipeline introduces data hazards which are not present in the absence of a pipeline, because results of previous instructions may not be available to a subsequent instruction. In addition, even for in-order instruction dispatch, if instructions are allowed to be active in different execution units at the same time, the different latencies of the execution units can result in control hazards and out-of-order instruction completion. Data hazards and control hazards generally must be avoided in order to ensure proper operation of a pipelined processor.

A very common type of data hazard which can arise in a pipelined processor is known as a Read After Write (RAW) data hazard. FIG. 2A illustrates an exemplary RAW data hazard, showing how the pipelined processor 10 of FIG. 1 executes add instructions $i_1$ and $i_2$ for processor clock cycles 1 through 5. Instruction $i_1$ adds the contents of its source registers $r_2$ and $r_3$ and writes the result to its destination register $r_1$. Instruction $i_2$ adds the contents of its source registers $r_5$ and $r_1$ and writes the result to its destination register $r_4$. It can be seen that, unless otherwise prevented, the instruction $i_2$ in the conventional processor 10 will read register $r_1$ in clock cycle 3, before the new value of $r_1$ is written by instruction $i_1$. In a non-pipelined processor, the instructions as shown in FIG. 2A would not create a hazard, since instruction $i_1$ would be completed before the start of instruction $i_2$.

FIG. 2B illustrates a less common data hazard, referred to as a Write After Write (WAW) data hazard, that can arise in a conventional pipelined processor. In this example, the processor executes instructions $i_1$ and $i_2$ for processor clock cycles 1 through 11. Instruction $i_1$ multiplies the contents of its source registers $r_2$ and $r_3$ and writes the result to its destination register $r_1$. Instruction $i_2$ adds the contents of its source registers $r_4$ and $r_5$ and writes the result to its destination register $r_1$. It can be seen that, unless otherwise prevented, instruction $i_2$ in the conventional processor will write to register $r_1$ in clock cycle 5, before instruction $i_1$, and then $i_1$ will incorrectly overwrite the result of $i_2$ in register $r_1$ in clock cycle 11. This type of hazard could arise if, for example, instruction $i_1$ were issued specula and $i_2$. In the case of in-order instruction completion, instruction $i_1$ will not affect the outcome, since in-order completion will discard the result of $i_1$. However, as described above, the hazard is significant in the presence of out-of-order instruction completion.

FIG. 2C shows an example of a control hazard which can arise in a conventional pipelined processor. Control hazards generally result from jumps in the instruction stream. For example, when a branch is taken, an instruction address register, which serves as a program counter, is changed to a new value. As a result, there may be instructions that have been already fetched into the pipeline but should not be executed. In the example of FIG. 2C, a control hazard arises when instructions $i_1$ through $i_4$ are executed for clock cycles 1 through 11. Instruction $i_2$ is a branch instruction brz that will branch to label, i.e., to instruction $i_4$, if the contents of its source register $r_4$ have a particular value. In the pipelined processor 10 of FIG. 1, it is assumed that the results of the branch instruction $i_2$ are not effective until $i_2$ reaches writeback (W) in clock cycle 5. If the branch is taken, control should jump to instruction $i_4$ without ever reaching instruction $i_3$, but by the time this is known, instruction $i_3$ is already executing.

A number of techniques have been developed in an attempt to address the problems associated with data and control hazards. One such technique, known as "scoreboarding," provides dynamic scheduling of instructions, using a central controller known as a scoreboard, so as to allow out-of-order instruction issue. This approach is often associated with the Control Data 6600 computer, and is described in greater detail in D. A. Patterson and J. L. Hennessy, "Computer Architecture: A Quantitative Approach," Second Edition, Morgan Kaufmann, San Francisco, Calif., pp. 240–251, 1996. A related technique which also utilizes dynamic scheduling to accommodate out-of-order instruction issue is known as Tomasulo's Algorithm, and is described in the above-cited D. A. Patterson and J. L. Hennessy reference at pp. 251–261. Another known technique involves utilizing a reorder buffer, also referred to as a retire buffer. In accordance with this technique, rather than allowing results to be written back to registers immediately after execution, the results are stored in the retire buffer until they can be written back in sequential program order.

Although these and other conventional techniques can resolve pipeline hazard problems, such techniques generally require the addition of substantial complexity to the processor. For example, scoreboarding requires a separate central control unit, Tomasulo's Algorithm requires additional structures such as a broadcast result bus, a register renaming mechanism, and reservation stations, and a retire buffer requires result storage and ordering logic. A need therefore exists for a different and simpler mechanism for avoiding pipeline hazards.

SUMMARY OF THE INVENTION

The invention provides methods and apparatus for avoiding hazards caused by execution unit latency and out-oforder instruction completion in a pipelined processor. The invention allows the processor to ignore the actual latency of execution units, essentially treating them as if they had single-cycle execution. The invention is thus referred to herein as "virtual single-cycle execution" or "impatient execution." In accordance with the invention, data and control hazards are avoided by placing locks on registers and stalling instructions when necessary as determined by the register lock status. Instructions are dispatched in a program-specified order, but are permitted to complete execution in a different order. This hides the true latency of the execution units, and allows an instruction decode unit to continue dispatching instructions as if the execution of each instruction completed in a single processor cycle.

In an illustrative embodiment of the invention, a set of register locks is maintained in the form of a stored bit vector in which each bit indicates the current lock status of a corresponding register. A decode unit in the processor receives an instruction fetched from memory, and decodes the instruction to determine its source and destination registers. The instruction is stalled for at least one processor cycle if either its source register or destination register is already locked. The stall continues until the source and destination registers of the instruction are both unlocked, i.e., no longer in use by other instructions. Before the instruction is dispatched for execution, the destination register of the instruction is again locked, and remains locked until after the instruction completes execution and writes its result to the destination register.

The invention thus allows instructions to be dispatched into execution during each processor cycle except when prevented by hazards, thereby effectively masking the latencies of the individual execution units. The invention does not require complex logic or other additional circuit structures, and can be used to provide object code compatibility between different processor implementations. These and other features and advantages of the present invention will become more apparent from the accompanying drawings and the following detailed description.

BRIEF DESCRIPTION OF THE DRAWINGS

FIG. 1 is a functional block diagram of a conventional pipelined processor.

FIGS. 2A, 2B and 2C illustrate data and control hazards which can arise in the conventional pipelined processor of FIG. 1.

FIG. 3B shows one possible implementation of a register locking mechanism which may be utilized in the pipelined processor of FIG. 3A.

FIGS. 4A, 4B and 4C illustrate the manner in which a pipelined processor in accordance with the invention avoids exemplary data and control hazards.

DETAILED DESCRIPTION OF THE INVENTION

Figure 3A:
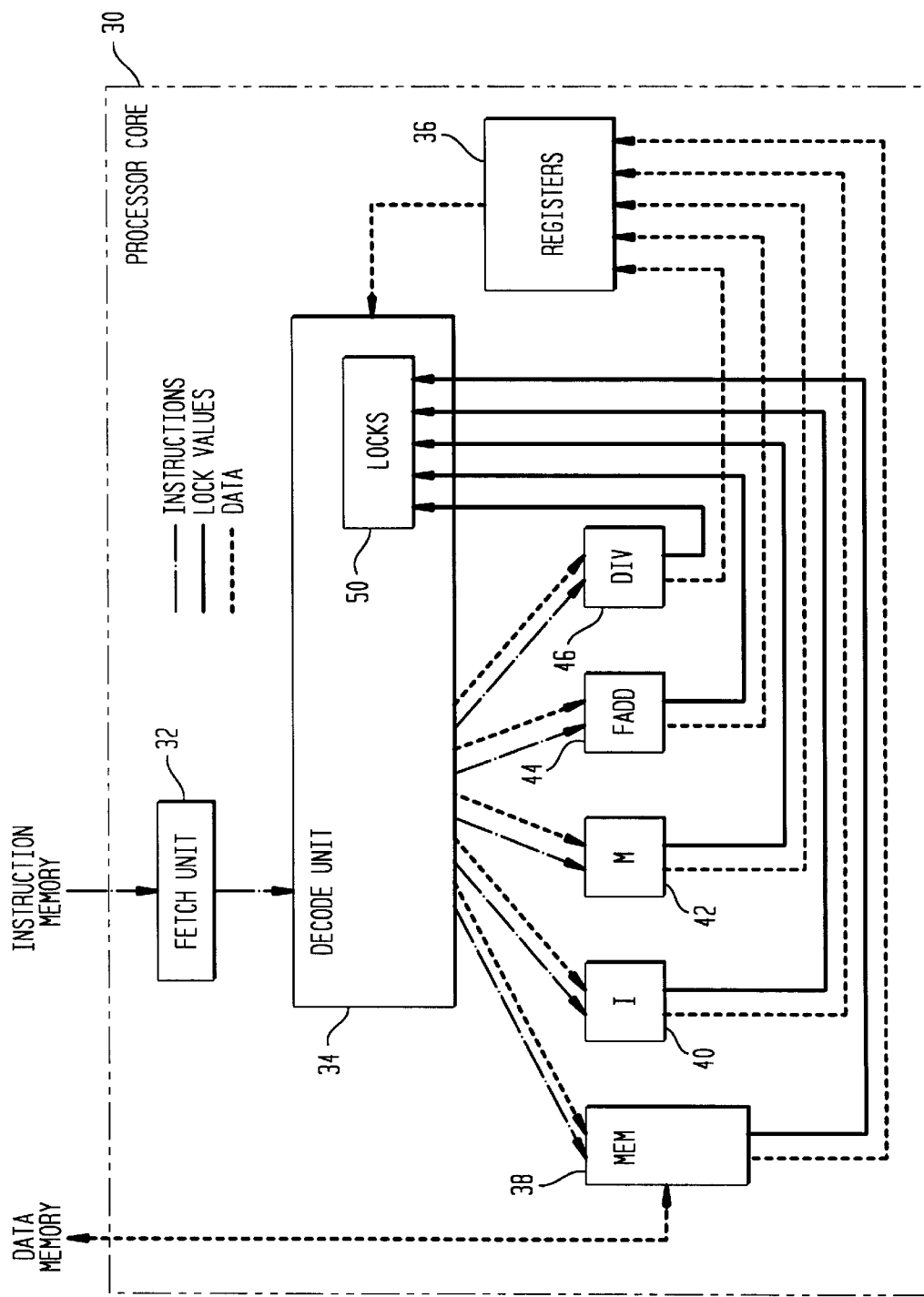
FIG. 3A is a functional block diagram of a pipelined processor in accordance with an illustrative embodiment of the invention.

The invention will be illustrated below in conjunction with an exemplary implementation of a pipelined processor. It should be understood, however, that the invention is more generally applicable to any processor in which it is desirable to treat execution units as having substantially single-cycle execution, i.e., to provide "virtual" single-cycle execution. The term "processor" as used herein is intended to include any device in which instructions retrieved from a memory or other storage element are executed using one or more execution units. Exemplary processors in accordance with the invention may therefore include, for example, microprocessors, application-specific integrated circuits (ASICs), personal computers, mainframe computers, network computers, workstations and servers, as well as other types of data processing devices.

FIG. 3A illustrates a portion of a pipelined processor in accordance with an exemplary embodiment of the invention. The processor includes a processor core 30 having a fetch unit 32, a decode unit 34 and a set of registers 36. Instructions are fetched by the fetch unit 32 from an instruction memory and delivered to the decode unit 34. The decode unit 34 decodes the instructions, reads data from one or more source registers associated with the instructions, and delivers the instructions and the necessary data to one of a number of execution units. The execution units in this embodiment include a memory (Mem) execution unit 38, a 1-cycle integer (I) unit 40, an 8-cycle integer/floating point multiplier (M) 42, a 4-cycle floating point adder (Fadd) 44, and a 15-cycle integer/floating point divider (Div) 46. These execution units operate in a conventional manner and will therefore not be described in detail herein. The results of operations performed in the execution units are stored in one or more designated destination registers in the set of registers 36. Conventional load and store instructions may be used, for example, to move data between registers 36 and a data memory external to the processor core 30. These load and store instructions are executed by the memory execution unit 38. It should be emphasized that the type and arrangement of elements in processor core 30 is exemplary only, and that the invention can be implemented with numerous alternative arrangements of these and other elements.

It will be assumed in this illustrative embodiment of the invention that instructions are dispatched for execution in order by the decoder unit 34. This order is specified by the program which includes the instructions. It will also be assumed that instructions which reach execution will be allowed to complete and write back their results. In other words, instructions are committed at dispatch.

In accordance with the invention, the decode unit 34 of FIG. 3A includes a set of register locks 50. The register locks 50 provide a lock indication for each of at least a subset of the registers in the set of registers 36. In general, the processor core 30 is configured so as to lock registers when operations are performed which can lead to a hazard. If a particular register is needed by an instruction and the lock indication for the register indicates that it is not locked, the instruction is free to use that register. However, if the lock indication indicates that the register is locked, the instruction waits until the register again becomes unlocked before using that register. As will be described in greater detail below, the register locks 50 in conjunction with appropriate instruction stalling can be used to avoid data and control hazards. This register locking and instruction stalling process of the present invention is referred to as "virtual single cycle execution" or "impatient execution."

FIG. 3B illustrates one possible implementation of a set of register locks 50 in accordance with the invention. In this implementation, the register locks 50 are in the form of a stored bit vector which includes a number of bits. Each of the bits of the bit vector is logically associated with a corresponding one of the registers in the set of registers 36. It is assumed for this example that the set of registers 36 includes a total of thirty-two registers. The register locks 50 therefore include thirty-two bits, designated $r_0, r_1, \ldots r_{31}$, as shown. Each bit $r_i$ indicates the lock status of a corresponding one of the registers 36. Each bit $r_i$ is set to zero when its corresponding register is unlocked, and set to 1 when its corresponding register is locked. The register locks 50 thus provide an indication of the lock status of each of the registers 36. Although shown as implemented within the decode unit 34 in the embodiment of FIG. 3A, a locking mechanism in accordance with the invention could also be provided in one of the registers 36, within another component of the processor core 30, or as a stand-alone element in the core 30.

The manner in which the pipelined processor of FIG. 3A avoids Read After Write (RAW) data hazards will now be described in greater detail. In the context of RAW data hazards, a locked register may be viewed as a register whose content will be updated by an instruction which is not yet complete, i.e., a register whose content is currently invalid. Before an instruction retrieved by fetch unit 32 and decoded in decode unit 34 can use a source register in the set of registers 36, the following register read algorithm is carried out:

register read:
    while (any source register is locked) stall one cycle;
    lock destination registers;
    read source registers;

The register read algorithm applies a stall to all instructions which have not yet read their operands from the corresponding source registers, while allowing all other instructions to proceed. This algorithm may be implemented in a register read unit incorporated into the decode unit 34. In the exemplary embodiment of FIG. 3A, the stall is implemented in the decode unit 34, such that all instructions already dispatched to the execution units will proceed without stalling. When writing back results to destination registers in the set of registers 36, the following register writeback algorithm is carried out:

register writeback:
    write destination registers;
    unlock destination registers;

The register writeback algorithm ensures that the destination registers are unlocked after the writing back operation is complete. In the exemplary embodiment of FIG. 3A, each of the execution units 38, 40, 42, 44 and 46 are configured to incorporate this algorithm.

FIG. 4A illustrates the manner in which the above-described register locking mechanism avoids the RAW data hazard described in conjunction with FIG. 2A. Execution of add instructions $i_1$ and $i_2$ is shown for clock cycles 1 through 7. It can be seen that the RAW hazard of FIG. 2A is avoided because, in accordance with the register read algorithm, instruction $i_2$ will stall at the decode stage (D) until its source register $r_1$ becomes available. This is after completion of the writeback (W) stage of instruction $i_1$, which unlocks the register $r_1$ in accordance with the register writeback algorithm.

The pipelined processor of FIG. 3A also avoids Write After Write (WAW) data hazards. In this case, a modified register read algorithm is used to check that both the source and destination registers are unlocked. The modified register read is as follows:

register read:
    while (any source or destination register is locked) stall one cycle;
    lock destination registers;
    read source registers;

As in the previous register read algorithm, this register read algorithm applies a stall to all instructions which have not yet read their operands from the corresponding source registers, while allowing all other instructions to proceed. This algorithm may also be implemented in a register read unit incorporated into the decode unit 34. When writing back results to destination registers in the set of registers 36, the same register writeback algorithm given previously is carried out, to ensure that the destination registers are unlocked after the writing back operation is complete.

FIG. 4B illustrates the manner in which the above-described register locking mechanism avoids the WAW data hazard described in conjunction with FIG. 2B. Execution of instructions $i_1$ and $i_2$ of FIG. 2B is shown in FIG. 4B for clock cycles 1 through 14. It can be seen that the WAW hazard of FIG. 2B is avoided because, in accordance with the modified register read algorithm, instruction $i_2$ will stall at the decode stage (D) until its destination register $r_1$ becomes available. As in the FIG. 4A example, instruction $i_2$ is stalled until after completion of the writeback (W) stage of instruction $i_1$, at which time the register $r_1$ is unlocked in accordance with the register writeback algorithm.

The manner in which the pipelined processor of FIG. 3A avoids control hazards will now be described in greater detail. As noted above, impatient execution in this illustrative embodiment of the invention assumes that instructions are dispatched in order, and that instructions are committed at dispatch. The effect of various types of branch instructions will be considered. Instructions generally must be placed in execution in the logically correct order, whether or not the branch is taken. Therefore, instructions following a branch are stalled until the branch is resolved, and if the branch is taken, the new instructions following the branch are fetched. Once the processor knows it has the correct instructions, it dispatches them. Note that the instructions which precede the branch may not have completed execution by the time instructions following the branch begin or complete. Such a situation is acceptable in a processor in accordance with the invention, because the above-described register locks will ensure that data hazards are avoided.

As a first example, consider an interrupt handler which does not need to save user state. The handler may, for example, use a privileged set of registers and not need to disturb the state of the user-visible processor. In this case, the interrupt handler may simply begin placing its own instructions in the fetch stream. User program instructions may still be executing, but will complete, and the register locks will be updated when the instructions complete. When the interrupt handler is done, control can simply be returned to the first user program instruction which was not dispatched.

As another example, consider a call to a routine which requires saving user state. In this case, one of the following approaches can be used: (1) allow dispatched instructions to complete execution; or (2) attempt immediately to save registers which will be required by the routine, but respect the status of the register locks. In approach (1), after allowing all dispatched instructions to complete execution, it is guaranteed that all registers will be unlocked. Approach (2) may be quicker, because a callee-save routine which only uses a few registers may find that all the registers it needs to use are unlocked. Such a determination could be made in a single operation by, for example, comparing a bit mask of needed registers the register locks bit vector 50 of FIG. 3B. If all the registers that the routine needs to use are unlocked, the routine could proceed with the save immediately, even though some instructions may not be complete. For both approaches (1) and (2), state can be saved without saving register locks, since all registers saved will be unlocked. At the end of the call, state is restored, and execution begins with the first instruction which was not previously dispatched.

FIG. 4C illustrates the manner in which the above-described techniques avoid the control hazard described in conjunction with FIG. 2C. Execution of instructions $i_1$–$i_4$ of FIG. 2C is shown in FIG. 4C for clock cycles 1 through 11. At cycle 4, the result of the branch instruction $i_2$ is unknown, so the pipeline is stalled for instructions following $i_2$ as shown. At cycle 5, the result of the branch instruction $i_2$ is known, and instruction $i_3$ should not be executed, so it is removed from the decode stage (D). Also at cycle 5, instruction $i_4$ is fetched. Meanwhile, instruction $i_1$ does not complete until cycle 11. The control hazard arising from premature execution of instruction $i_3$ is therefore avoided using register locking and stalling in accordance with the invention.

Since the above-described illustrative embodiment of impatient execution generally forces one instruction to wait for the results of another, it may seem that there is a potential for deadlock, i.e., an instruction waiting for a result which never comes. However, since it assumed in the illustrative embodiment that instructions are dispatched in order, deadlock is avoided. This can be shown as follows. For an instruction stream $i_1, i_2, \ldots i_n, \ldots$, instruction $i_n$ depends only on instructions $i_1, i_2, \ldots, i_{n-1}$. If instruction $i_n$ is stalled waiting for one or more instructions $i_k$, then for each such instruction $i_k$, <n, and, since instructions are dispatched in order, each such instruction $i_k$ has already been dispatched and will complete. It should be noted that each instruction $i_n$ is only restricted to depend on previous instructions. Each $i_n$ may be a packet of instructions $\{i_j, i_{j+1}, \ldots, i_{j+l}\}$, as long as each instruction only depends on previous instructions or instruction packets, and not on other instructions in the same packet.

The virtual single-cycle execution of the present invention can be used in a very long instruction word (VLIW) processor. As noted previously, the instruction stream may include packets of independent instructions. Virtual single-cycle execution allows compound VLIW instructions to be dispatched each cycle, stalling only if required to avoid hazards. Portions of each VLIW instruction may be completed at different times, but register locks will prevent hazards.

It should be noted that the invention may affect the usage distribution of register read ports. Since in the illustrative embodiment instructions are not restricted to complete in order, registers will generally not be written in order, although the invention guarantees that instructions appear to have completed in program order before any result is used or state saved. Even if a processor issues only one instruction to an execution unit each cycle, more than one instruction may reach writeback in the same cycle. The average number of register write ports needed each cycle will generally remain the same, but the peak number may be higher. An implementation with a limited number of register write ports may need to stall some instructions if more than the available number of write ports is required.

The embodiments of the present invention described above may be configured to meet the requirements of a variety of different processing applications and environments, using any desired type of pipelining. The above-described embodiments of the invention are therefore intended to be illustrative only. Numerous alternative embodiments within the scope of the following claims will be apparent to those skilled in the art.

What is claimed is:

1. A processor comprising:
   a decode unit for decoding an instruction retrieved from a memory;
   an execution unit for executing at least a portion of the instruction;
   a plurality of registers including at least one register associated with the instruction; and
   a locking mechanism operative to indicate a lock status for each of at least a subset of the plurality of registers, the subset including the register associated with the instruction, the locking mechanism comprising a stored bit vector having a plurality of bits indicative of the lock status for the corresponding registers, wherein the lock status of the register associated with the instruction is checked prior to permitting the instruction to execute, and wherein the instruction is automatically committed to completion of execution if the register lock status when checked indicates that the associated register is unlocked, such that the instruction is thereby permitted to complete execution, relative to other instructions associated with a program containing the instruction, in an order that is different than a dispatch order of the instructions as specified by the program, wherein the completion of execution includes writeback of results of execution of the instruction to one or more destination registers.

2. The processor of claim 1 wherein each of the bits of the stored bit vector is logically associated with one of the registers.

3. The processor of claim 1 wherein the register associated with the instruction includes at least one of a source register and a destination register for the instruction.

4. The processor of claim 1 further including a plurality of execution units, wherein the decode unit dispatches a plurality of instructions to the execution units as if the execution of each of the instructions completed in a single processor cycle.

5. The processor of claim 1 further including a plurality of execution units, wherein the instruction is committed to execute when it is dispatched by the decode unit to one of the execution units.

6. The processor of claim 1 further including a plurality of execution units, wherein multiple instructions are dispatched by the decode unit to the execution units in an order established by a program sequence, but the instructions are permitted to complete execution in a different order.

7. The processor of claim 1 wherein the lock status of a given register is set to locked if the register is determined to be a destination register of the instruction.

8. The processor of claim 1 wherein the instruction is stalled for at least one processor cycle if at least one of a source register and a destination register of the instruction has a lock status indicating that the register was already locked by another instruction.

9. The processor of claim 1 wherein the lock status of a destination register of the instruction is changed from locked to unlocked when a result of the instruction is written to the destination register.

10. A method of processing instructions in a processor including a decode unit, at least one execution unit and a plurality of registers, the method comprising the steps of:
    decoding an instruction retrieved from a memory;
    checking a lock status of a register associated with the instruction prior to permitting the instruction to execute; and storing a lock status for each of at least a subset of the plurality of registers, the subset including the register associated with the instruction, wherein the storing step includes storing a bit vector having a plurality of bits indicative of the lock status for the corresponding registers, and wherein the instruction is automatically committed to completion of execution if the register lock status when checked indicates that the associated register is unlocked, such that the instruction is thereby permitted to complete execution, relative to other instructions in a program containing the instruction, in an order that is different than a dispatch order of the instructions as specified by the program, wherein the completion of execution includes writeback of results of execution of the instruction to one or more destination registers.

11. The method of claim 10 wherein each of the bits of the stored bit vector is logically associated with one of the registers.

12. The method of claim 10 wherein the register associated with the instruction includes at least one of a source register and a destination register for the instruction.

13. The method of claim 10 further including the step of dispatching instructions from the decode unit to one of a plurality of execution units as if the execution of each of the instructions completed in a single processor cycle.

14. The method of claim 10 wherein the instruction is committed to execute when it is dispatched by the decode unit to one of a plurality of execution units.

15. The method of claim 10 further including the steps of dispatching multiple instructions from the decode unit to one or more execution units in an order established by a program sequence, and permitting the instructions to complete execution in a different order.

16. The method of claim 10 further including the step of setting the lock status of a given register is set to locked if the register is determined to be a destination register of the instruction.

17. The method of claim 10 further including the step of stalling the instruction for at least one processor cycle if at least one of a source register and a destination register of the instruction has a lock status indicating that the register was already locked by another instruction.

18. The method of claim 10 further including the step of changing the lock status of a destination register of the instruction from locked to unlocked when a result of the instruction is written to the destination register.

19. An integrated circuit comprising:

a decode unit for decoding an instruction;

an execution unit for executing at least a portion of the instruction;

a plurality of registers including at least one register associated with the instruction; and a locking mechanism operative to indicate a lock status for each of at least a subset of the plurality of registers, the subset including the register associated with the instruction, the locking mechanism comprising a stored bit vector having a plurality of bits indicative of the lock status for the corresponding registers, wherein the lock status of the register associated with the instruction is checked prior to permitting the instruction to execute, and wherein the instruction is automatically committed to completion of execution if the register lock status when checked indicates that the associated register is unlocked, such that the instruction is thereby permitted to complete execution, relative to other instructions in a program containing the instruction, in an order that is different than a dispatch order of the instructions as specified by the program, wherein the completion of execution includes writeback of results of execution of the instruction to one or more destination registers.

20. The integrated circuit of claim 19 wherein the instruction is stalled for at least one processor cycle if at least one of a source register and a destination register of the instruction has a lock status indicating that the register was already locked by another instruction.

21. A processor comprising:

a decode unit for decoding an instruction retrieved from a memory;

an execution unit for executing at least a portion of the instruction;

a plurality of architectural registers including at least one register associated with the instruction, the at least one register comprising at least one of a source register and a destination register specified in the instruction; and a locking mechanism operative to indicate a lock status for each of at least a subset of the plurality of architectural registers, the subset including the register associated with the instruction, the locking mechanism comprising a stored bit vector having a plurality of bits indicative of the lock status for the corresponding registers, wherein the lock status of the register associated with the instruction is checked, without use of an operand-based search, prior to permitting the instruction to execute, such that if the lock status for the register indicates that the register is not locked, the instruction is permitted to utilize the register immediately, but if the lock status indicates that the register is locked, the instruction waits until the register again becomes unlocked before utilizing the register.

22. A method of processing instructions in a processor including a decode unit, at least one execution unit and a plurality of architectural registers, the method comprising the steps of:

decoding an instruction retrieved from a memory;

checking a lock status of a register associated with the instruction, the register comprising at least one of a source register and a destination register specified in the instruction, without use of an operand-based search, and prior to permitting the instruction to execute; and storing a lock status for each of at least a subset of the plurality of architectural registers, the subset including the register associated with the instruction, wherein the storing step includes storing a bit vector having a plurality of bits indicative of the lock status for the corresponding registers;

wherein if the lock status for the register indicates that the register is not locked, the instruction is permitted to utilize the register immediately, but if the lock status indicates that the register is locked, the instruction waits until the register again becomes unlocked before utilizing the register.

23. An integrated circuit comprising:

a decode unit for decoding an instruction;

an execution unit for executing at least a portion of the instruction;

a plurality of architectural registers including at least one register associated with the instruction, the at least one register comprising at least one of a source register and a destination register specified in the instruction; and a locking mechanism operative to indicate a lock status for each of at least a subset of the plurality of registers, the subset including the register associated with the instruction, the locking mechanism comprising a stored bit vector having a plurality of bits indicative of the lock status for the corresponding registers, wherein the lock status of the register associated with the instruction is checked, without use of an operand-based search, prior to permitting the instruction to execute, such that if the lock status for the register indicates that the register is not locked, the instruction is permitted to utilize the register immediately, but if the lock status indicates that the register is locked, the instruction waits until the register again becomes unlocked before utilizing the register.

\* \* \* \* \*

UNITED STATES PATENT AND TRADEMARK OFFICE
CERTIFICATE OF CORRECTION

PATENT NO.   : 6,317,821 B1                                               Page 1 of 1
DATED        : November 13, 2001
INVENTOR(S)  : Batten et al.

It is certified that error appears in the above-identified patent and that said Letters Patent is hereby corrected as shown below:

<u>Title page,</u>
Item [73], the Assignee is changed from "Lucent Technologies Inc., Murray Hill, NJ (US)" to -- Agere Systems Guardian Corp., Orlando, FL(US)

Signed and Sealed this

Thirtieth Day of July, 2002

*Attest:*

JAMES E. ROGAN
*Attesting Officer*            *Director of the United States Patent and Trademark Office*